Dec. 14, 1965   R. REUTER   3,222,737
METHOD OF PREPARING CERAMIC MOLDS
Filed July 19, 1962
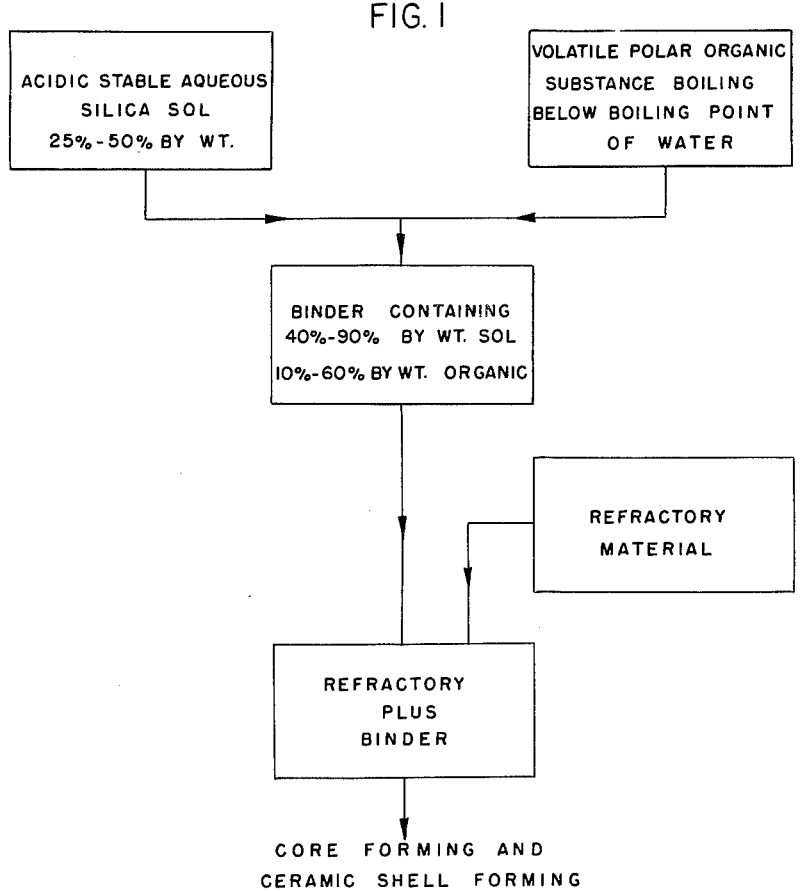
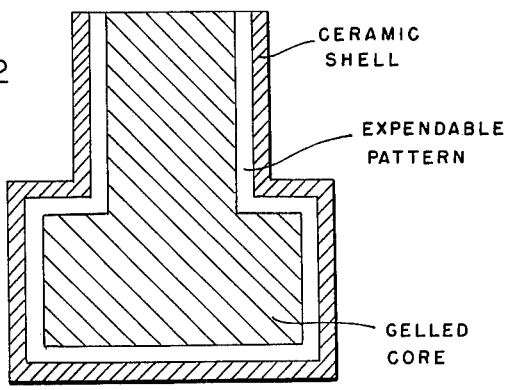
INVENTOR:
RAYMOND REUTER
BY
Marzall, Johnston, Cook, Root
ATT'YS 3,222,737
METHOD OF PREPARING CERAMIC MOLDS
Raymond Reuter, Palos Park, Ill., assignor to Nalco Chemical Company, Chicago, Ill., a corporation of Delaware
Filed July 19, 1962, Ser. No. 211,091
7 Claims. (Cl. 22—196)

The instant invention relates to an improved method for preparing ceramic molds. More particularly, this invention is concerned with use of novel liquid binding media valuable in the binding of solid refractory materials to produce improved ceramic molds.

In the past, many methods have been employed to produce ceramic molds for use in the metal casting art. For ease of classification these may be roughly broken down into two broad classes, those involving use of non-expendable patterns and those in which an expendable pattern is used. The former may also be referred to as the split mold process and includes such well-known practices as the conventional cope and drag foundry process, a split mold casting technique known as the Shaw Process, the "resin shell molding" foundry method, etc. These processes in which an expendable pattern is used may be generally classified as a lost wax technique whereby more precision-type molds may be made. Among this generic class of precision casting, investment casting as well as a technique referred to as a ceramic shell molding process are includable.

In the above processes there is generally employed a binding agent used as a combination carrier and dispersing agent for the refractory materials. These binding agents themselves, when employed in the form of a free-flowing liquid are set into hard rigid masses along with the refractory when the liquid phase of the binder is removed as by volatilization. A suitable liquid binder must have the properties of both ability to impart high refractoriness to the ceramic shell so produced and concurrent property of relatively rapid drying. Heretofore these properties have not been simultaneously available in prior art ceramic binders. For example, if rapid drying is desired, many of the binders employed in some of the above enumerated processes generally decrease the refractoriness, that is, the stability of high temperatures, of the subsequently formed ceramic mold. Likewise in many processes, when a ceramic mold is desired, having greater refractory properties than average, a binder must necessarily be employed which can only be dried over long periods of time. To impart increased refractory property to the ceramic mold, a binder must be employed which itself contains high quantities of refractory material. But employment of such a binder many times results in sacrifice of rapid drying. For example, while hydrolyzed ethyl silicate finds acceptance as a suitable binding material due to its fairly rapid drying, after the volatilization of the alcoholic vehicle of the ethyl silicate during the drying step there is produced a less than desired total silica content and consequent low refractoriness of the ceramic mold. Again, while aqueous silica sols find ready use in most of the above processes, the sols which are aqueous liquids having colloidally dispersed therein substantially discrete, dense, non-agglomerated particles of silica, oftentimes do not have the rapid drying property desired. This problem becomes particularly acute when deep cores with thin orifices are to be produced. These ceramic molds may dry only over long periods of time since much of their surface area is not suitably disposed to drying by the atmosphere. Again, these types of molds, due to their rather fragile structure, cannot be suitably dried at higher temperatures, but resort must be made to a slower room temperature drying technique.

It would therefore be of benefit to the art if a binding material could be simply and efficiently made which has the desired property of rapid drying concomitant with high refractoriness. It would be of further advantage if this material could be employed in a wide variety of processes involving production of ceramic molds for use in production of cast metal objects.

It therefore becomes an object of the invention to provide an improved method of producing ceramic molds which are useful in casting metal objects.

Another object of the invention is to produce a novel binding composition which may be used in a variety of casting techniques involving production of a ceramic mold, which binding composition has both high refractoriness and rapid drying properties.

A specific object of the invention is to provide a siliceous liquid binding composition useful in producing narrow, deep, hollow cores through means of investment casting techniques. Through use of these binders cores may be dried in a relatively short time even at room temperature, and additionally possess requisite refractory property.

In accordance with the invention it has been discovered that a quick-drying, highly refractory liquid siliceous binding composition may be produced by a combination of a stable, acid silicia sol and a volatile polar organic substance, compatible with the above silica sol. This binder may be suitably employed in any process for preparing ceramic molds for use in production of cast metal objects and, in particular for use in processes involving production of a ceramic mold which must be necessarily dried at room temperature in a relatively short time. The binder finds particular use in lost wax techniques involving an expendable pattern such as in conventional investment casting processes. The binding composition finds its most desired use in production of deep cores having thin orifices which are particularly difficult to dry at room temperatures, but yet due to their fragile structure must, for best results, be kept at a constant room temperature which results in a slow drying technique.

In the accompanying drawings:
FIGURE 1 is a flow diagram illustrating the process, and
FIGURE 2 is a cross section of a mold illustrating the ceramic shell, the expendable pattern and the gelled core.

The acid, stabilized silica sols which go to make up one component of the binder composition are aqueous salt-free sols which comprise an aqeous liquid having colloidally dispersed therein from 3 to 50% by weight of substantially discrete, dense, non-agglomerated particles of silica. By far the most preferred acid silica sols are those in which the silica content of the sol ranges from 25 to 50% by weight silica, giving therefore the more desired higher refractory material.

The silica sols of the invention, which may be prepared by a preferred technique hereinafter fully explained, all have pH's ranging from 2.6–3.8. Preferably they have a pH in the range of 2.9–3.5. Their electrical conductivities are all less than 1000 micromhos/cm. at 77° F. The more preferred acid silica sols have conductivities ranging from 150–500 micromhos/cm. 77° F. The silica particles themselves have surface areas ranging from 50 to 600m.$^2$/g. Binder compositions containing from 40 to 90% by weight of the acidic stable salt-free silica sols have given best results in the invention.

The volatile polar organic substance which is combined with the above acid silica sols to form the novel binder compositions of the invention may be chosen from a wide variety of substances. For example, polar low molecular weight ketones, aldehydes, carboxylic acids, alcohols, and the like may be used as long as these polar substances have sufficient compatibility with the above acid aqueous silica sols and have the additional property of volatilization at relatively low temperatures, say about below the boiling point of water. Preferred binder compositions contain from 10 to 60% by weight of volatile polar organic substance.

It is greatly preferred that lower alkyl polar alcoholic compounds be employed in conjunction with the aqueous silica sols. These substances, due to low cost, availability, excellent compatibility with aqueous phases, and low boiling point ranges are particularly attractive in going to make up the binding compositions. Compounds such as methanol, ethanol, isopropanol, and the like are among a few of the preferred lower alkyl polar alcoholic compounds.

While aqueous sols containing silica particles as the dispersed phase were known as refractory binding aids, heretofore these silica sols could not be suitably combined with polar organic substances. This was true primarily because the silica sols previously employed were all alkaline in nature and contained relatively large amounts of dissolved salts, such as sodium sulfate. Due to the relatively high pH of the prior art silica sols and high dissolved inorganic solids content, the sols were not compatible to any substantial degree with volatile organic substances, and such an attempted combination generally resulted in silica precipitation or sol gellation. Moreover, these prior art alkaline silica sols had sufficient stability only at a relatively high pH due to presence of dissolved electrolytes. Only with the advent of production of stable purified acid sols of relatively high silica content, was it possible to combine a silica sol with a relatively volatile polar organic substance, and have both stability and high silica content in the product.

A greatly preferred acid, stable, aqueous, silica sol useful in producing the binders of this invention is described in a copending application filed April 17, 1961 and having a Serial No. 103,425. The disclosure of this application is herein incorporated by reference.

The method of producing this sol, described in the above identified application, includes the steps of contacting an alkaline silica sol with an ion exchange system containing a hydrogen form strong acid cation exchange resin, allowing the thus treated sol to age under certain specific conditions and subsequently again treating the aged sol with a hydrogen form strong acid cation resin. It is essential that the sols be treated at least once with an anion exchange resin. This treatment with the anion exchange resin can take place either before the aging step, after the aging step, or both before and after the aging step. In a preferred embodiment of this process, the pH of the aqueous silica sol is adjusted after the initial treatment with the ion exchange resin system.

The finished sols may be further characterized as having a specific conductivity less than 1,000 micromhos/cm. at 77° F. which is derived primarily from the dissociation of the silanol groups on the surfaces of the silica particles. Preferably these sols have a conductivity ranging from 100 to 500 micromhos/cm.

The sols produced by these processes have the same silica content, e.g., 3–50% as the starting sols and have specific surface areas ranging between 50–600m.$^2$/g. For use as an investment casting binder it is greatly preferred that the starting alkaline sols contain at least 25% silica. The final preferred acid sols then will have silica contents of between 25% and 50% by weight. The many advantages of using a higher silica content product as a binder component in an investment casting process are apparent.

The following example will serve to illustrate the production of the acid silica sol. The conductance measurement, abbreviated as "mmhos," is the specific conductance in micromhos/cm. at 77° F.

*Example 1*

A two-drum (110 gallons) quantity of a commercially available 35% silica sol was deionized by passing the sol through a six inch diameter column containing 25 inches of a strong base anion exchange resin at the bottom of the column and 25 inches of a strong acid cation exchange resin at the top of the column. The strong base anion exchange resin was a commercially available product known as Nalcite SBR which is described in U.S. Patent 2,591,573. The strong acid cation exchange resin was the commercially available product Nalcite HCR which is described in U.S. Patent 2,366,007. The deionization of the sol was carried out at a flow rate of 0.75 g.p.m. (gallons per minute) which is equivalent to 5 g.p.m./ft.$^2$. A composite of the effluent from the column produced a product having a pH of 2.1 and a conductance of 650 mmhos. The low pH indicated that some acid leakage had occurred through the anion bed. After standing overnight, the material again was passed through the ion exchange unit. The composite of this material gave a pH of 3.10 and a conductance of 395 mmhos. This product is believed to be almost permanently stable.

One of the accepted theories of colloidal chemistry is that the relation of silica sols is caused by the condensation of silanol groups on the surface of the particles which forms siloxane linkages. The fewer collisions between the individual particles, the less likely it is that the silanol groups of different particles will react to form siloxane groups. The particles tend to remain apart because of the negative charge on their surface. It is known that OH ions in the solution catalyze the condensation of silanol groups. It is also known that neutral salts which are present in the solution reduce the repulsive force exerted by the charged particles. In the above process substantial amounts of neutral salts are not formed during the stabilization step and the silica sol product may thereby be combined with a volatile substance such as a low boiling lower alkyl alcohol to form a stable liquid composite useful as an investment casting binder.

As was pointed out above, it is likely that the increase in pH of the deionized sol is due to the presence of occluded sodium ions. Viscosity studies have shown that there is an occluded volume of about 5% in the sol particle. By allowing the product to stand for at least four hours and preferably for at least 14 hours, the bulk of the sodium ions diffuse out into the liquid where the second deionization will remove them. It has been found that this double ion exchange treatment produces a product containing insufficient residual sodium to increase the pH of the sol above about 3.2

It would, of course, be possible to pass the sol more than twice through the deionization bed. Such a procedure, however, would be impractical from a commercial standpoint and would not increase the stability of the sol to any substantial extent.

Under certain conditions, it has been found to be desirable to add minor amounts of an acidic material after the second deionization step. These acidic materials may be selected from low molecular weight acids such as hydrochloric, sulfuric, acetic and phosphoric, with the latter two being the preferred members of this class. The amount added usually will not be more than 50 parts per million, and preferably 10–30 parts per million. These acids tend to neutralize any metallic corrosion products or traces of alkalinity leached from drum or tank coatings during the storage and transportation of the sols.

The following table sets forth alkaline sols which exemplify the materials which can be treated by the above process.

|  | Nalcoag 1015 | Nalcoag 1030 | Nalcoag 1035 | Nalcoag 1050 |
| --- | --- | --- | --- | --- |
| Percent colloidal silica as $SiO_2$ | 15 | 30 | 35–36 | 49–50 |
| pH | 8.6 | 10.2 | 8.6 | 9.0 |
| Viscosity at 77° F., cps | <5 | <5 | <5 | <30 |
| Specific gravity at 68° F | 1.09 | 1.205 | 1.255 | 1.385 |
| Average surface area, m.²/gram of $SiO_2$ | 330–430 | 190–270 | 135–190 | 120–150 |
| Average particle size, millimicrons | 7.9 | 11–16 | 16–22 | 20–25 |
| Density lbs./gallon at 68° F | 9.1 | 10.0 | 10.5 | 11.6 |
| Freezing point °F | 32 | 32 | 32 | 32 |
| $Na_2O$ percent | 0.04 | 0.40 | 0.10 | 0.3 |

The holding period between the deionization steps can range from 1 hour up to as long as one week or more. Our preferred holding period is from 14 to about 48 hours, and our most preferred holding period is from 16 to 24 hours.

It is understood, of course, that the invention is not limited to acid stable silica sols solely produced by the above process, but any acid silica sols may be employed in conjunction with the volatile organic materials of the invention to give the ceramic binding materials.

The following examples show the effectiveness of the acid sol binders of the invention.

*Example II*

In this particular example a plurality of coatings were built-up on an expendable pattern made of wax, which was later melted out. The particular ceramic mold which was to be formed from the expendable pattern was a blind core 6½" deep and 1¼" in diameter. Due to its intricacies and extreme depth this pattern had been extremely difficult to reproduce by prior art methods. For example, use of an alkaline silica sol in the same technique as outlined below, required approximately 4 days to dry all the coats applied. Attempts to accelerate the drying time by application of heat caused the wax to expand rapidly with subsequent breakage of the expendable pattern. Addition of isopropyl alcohol to the alkaline colloidal silica sol was completely unsuccessful since the two ingredients proved to be incompatible for purposes of preparing a suitable binding composition.

Preparation of this ceramic mold according to the practices of the instant invention is as follows: 700 ml. (955 grams) of an acid silica sol prepared according to the technique outlined in Example I which contained 49% silica by weight, were mixed with 300 ml. of isopropanol (240 grams) to produce a binding composition of total weight of 1195 grams. The above binding composition was placed in a 6 liter steel beaker. 1800 grams of a fused silica having an $SiO_2$ content of 97.3% by weight and a thermal coefficient of expansion of about $5 \times 10^{-7}$ cm./cm./° C., ground so that the largest particle present was no larger than 75 microns, were then added to the binder using good mechanical stirring. The binder itself which comprised 40% silica, 40% water, and 20% isopropanol made up approximately 40% of the total weight of the thus formed ceramic slip wherein the refractory made up approximately 60% by weight of the slip.

A clean wax paraffin was dipped into the prepared slip and then was stuccoed with the fused silica refractory. The wax pattern, so treated, was then dried for approximately 2 hours at room temperature. The dried stuccoed pattern was then again dipped into the above slip, stuccoed, and allowed to dry for another 2 hours. Four more coats were then applied over a total of approximately 2 hours. The dried coated pattern was then placed in a melt-out oven having a temperature of approximately 2000° F. The wax was melted out within a short period of approximately 2–3 minutes but the mold was held at this temperature for 15 minutes longer in order to decarburize it. During the melt-out and decarburizing steps no cracks or fissures occurred and the mold was entirely satisfactory for subsequent use in casting metal. Suitable metal articles of steel, aluminum, beryllium, copper, brass, magnesium were made from the above mold.

It is important to note that the binding composition while not only being entirely satisfactory for purposes of drying, also contained an amount of silica heretofore unattainable in quick-drying binders. This increased amount of silica, approximately 40% by weight of the binding composition, gave a final ceramic mold having high refractory properties.

*Example III*

Example II was repeated with the exception that a plurality of coatings were applied to a non-expendable cluster pattern which had no recessed cores. With the aid of a warm air dryer the coatings were applied in ten minutes and the mold was dried completely in 2½ hours.

*Example IV*

This example illustrates a preferred method of making cores according to the subject invention.

A minute amount of a MgO gel accelerator were added to 250 grams of a fused silica having an $SiO_2$ content of 97.3% by weight and a thermal coefficient of expansion of about $5 \times 10^{-7}$ cm./cm./° C. The solids were uniformly mixed and then combined with 100 grams of the binding composition of Example II. The above mix was then poured into a pattern cavity which was in the shape of a hollow turbine blade. The pouring was carried out slowly while the pattern was vibrated. This vibration helped the air bubbles to escape as the slurry filled the cavity pattern. The cavity was then plugged by pressing a flat piece of tacky wax across one opening. After the core stiffened, the wax plug was removed and, as soon as the core set the wax pattern was covered in accordance with the technique of building up a plurality of layers as outlined in Example II.

After the core had dried and the external coats were hardened, the investment was fired to melt and to remove the expendable pattern. Molten metal was then poured into the cavity formed by removing the pattern. After the metal had set, the core was soft enough to be blasted out of the blade. The finished metal blade corresponded exactly to the shape of the wax pattern. The core was conveniently dried at room temperature without harm to either the expendable pattern or the core itself. Even though the cavity of the pattern was deep, it was possible to free the volatile alcohol from within at room temperatures in a relatively short period of time in order to set the core.

In addition to more rapid drying times the ceramic molds of the invention through the use of the silica sol in conjunct with the volatile polar organic substance, such as alcohol, are more highly refractory than like molds made solely with such binders as alkaline silica sols. In addition, experiments run with casting of low carbon steel No. 1020, in molds made according to the invention, showed that since the ceramic mold possessed the above property of higher refractoriness, the metal articles so cast have improved metal surface due to the fact there is less change on the mold surface after casting. Also, with specific reference to the technique of applying two or more coatings to expendable patterns, it was noted that the initial coats or precoats "wet out" well on the pattern without generating deleterious foam. The binder compositions of the invention when used in processes involving non-expendable patterns gelled and set quickly to make excellent two piece molds.

Lastly, it is noted that the siliceous binding compositions of the invention are suitable for use in conjunction with any type of refractory. While fused silica is preferred due to its excellent thermal shock resistance, materials such as calcined alumina, quartz silica, zircon, sand, and the like may also be used. Also, the acid silica sol-volatile organic compound combination comprising the binder composition may be used in any one of the varieties of ceramic mold forming techniques as discussed above, such as split mold, cope and drag, the Shaw process, and investment castings including formation of a plurality of coatings through dip, etc., techniques and preparation of faster drying, higher refractory cores. It is preferred that the binding compositions of the invention be used in investment casting techniques of the type described above since the precision, usually required in these processes, may be imparted to the molds even if such molds are to be quickly dried.

When any desired refractory material is combined with the binder compositions of the invention a slurry may be produced suitable for use as a ceramic mold material made via some of the above enumerated processes, especially by the ceramic shell molding technique and Shaw process. Best results are obtained when the slurry contains a weight ratio of binder to refractory ceramic material within the range of 3:1 to 1:3. More preferred slurry compositions have a weight ratio of binder to refractory of 1:1 to 1:3.

In many processes the refractory is only dampened by combination with the binder in order to give the refractory sufficient body. For example, when sand is used as the refractory in a process such as the "cope and drag" technique, only sufficient binder is used which will impart to the sand the property of being easily rammed. In these cases 1–10% by weight of binder is used and preferably 2–6% based on the total weight of the mold ingredients.

It has been determined that particularly excellent hollow molds containing cores are formed when the binder compositions of the invention plus refractory are added to the cavity of an expendable pattern to form a core and the pattern is subsequently covered with a plurality of stuccoed layers in accordance with the techniques outlined above. Best results are obtained when fused silica is employed as the refractory in both core and mold formation.

By the term "ceramic mold" is meant to include both "mold," as used conventionally, meaning a body containing a cavity and "core," or that portion of a mold which helps to shape the inside of a hollow casting.

What is claimed is as follows:

1. An improved process for forming a hollow ceramic shell casting mold which comprises: blending a rapid-drying binder composition with a refractory material, said binder comprising 40–90% by weight of an acidic, stable, salt-free silica sol comprising an aqueous liquid having colloidally dispersed therein 25–50% by weight of substantially discrete, dense, non-agglomerated particles of silica having an average particle diameter of 5–150 mu, said silica sol having a pH ranging from 2.6 to 3.8 and a specific conductivity not greater than 1000 micromhos/cm., at 77° F., and 10–60% by weight of a lower alkyl polar organic alcohol having a carbon atom content no greater than 4, said alcohol being compatible with said silica sol; and pouring said blend into the cavity of a hollow expendable pattern; allowing said blend to gel sufficiently to form a gelled core; and thereafter coating the pattern with a ceramic material to build-up a plurality of coats around the pattern to form a ceramic shell.

2. In a method for preparing ceramic molds for use in production of cast metal objects which comprises mixing a refractory material and a binder to form a ceramic slip, contacting a pattern with said ceramic slip, hardening said ceramic slip, and separating said pattern and said hardened ceramic slip; the improvement which comprises using as a binder a composition which comprises an aqueous, acidic, stable, salt-free silica sol, having colloidally dispersed therein 25–50% by weight of substantially discrete, dense, non-agglomerated particles of silica having an average particle diameter of 5–150 mu, said sol having a specific conductivity not greater than 1000 micromhos/cm., at 77° F., and 10–60% by weight of a lower alkyl compatible with said silica sol and boiling at less than the boiling point of water.

3. In a method of preparing ceramic molds for use in production of cast metal objects, which comprises mixing a refractory material and a binder to form a ceramic slip, contacting a pattern with said ceramic slip, hardening said ceramic slip, and separating said pattern and said hardened ceramic slip; the improvement which comprises using as a binder a composition which comprises an acidic, stable, salt-free silica sol comprising an aqueous liquid having colloidally dispersed therein 25–50% by weight of substantially discrete, dense, non-agglomerate particles of silica having an average particle diameter of 5–150 mu, said silica sol having a pH range of 2.6–3.8 and a specific conductivity not greater than 1000 micromhos/cm. at 77° F., and a lower alkyl polar organic alcohol compatible with said silica sol.

4. In a method of preparing ceramic molds for use in production of cast metal objects, which comprises mixing a refractory material and a binder to form a ceramic slip, contacting a pattern with said ceramic slip, hardening said ceramic slip, and separating said pattern and said hardened ceramic slip; the improvement which comprises using as a binder a composition which comprises an acidic, stable, salt-free silica sol comprising an aqueous liquid having colloidally dispersed therein 25–50% by weight of substantially discrete, dense, non-agglomerated particles of silica having an average particle diameter of 5–150 mu, said silica sol having a pH range of 2.6–3.8 and a specific conductivity not greater than 1000 micromhos/cm. at 77° F., and a lower alkyl polar organic alcohol, containing not more than four carbon atoms, said alcohol being compatible with said silica sol.

5. In a method of preparing ceramic molds for use in production of cast metal objects, which comprises mixing a refractory material and a binder to form a ceramic slip, contacting a pattern with said ceramic slip, hardening said ceramic slip, and separating said pattern and said hardened ceramic slip; the improvement which comprises using as a binder a composition which comprises 40–90% by weight of an acidic, stable, salt-free silica sol comprising an aqueous liquid having colloidally dispersed therein 25–50% by weight of substantially discrete, dense, non-agglomerated particles of silica having an average particle diameter of 5–150 mu, said silica sol having a pH range of 2.6–3.8 and a specific conductivity not greater than 1000 micromhos/cm. at 77° F., and 10–60% by weight of a lower alkyl polar organic alcohol, having a carbon atom content not greater than four, said alcohol being compatible with said silica sol.

6. The method of claim 5, wherein said organic alcohol is selected from the group consisting of methanol, ethanol and isopropanol.

7. In a method of preparing ceramic molds for use in production of cast metal objects, which comprises mixing a refractory material and a binder to form a ceramic slip, contacting a pattern with said ceramic slip, hardening said ceramic slip and separating said pattern and said hardened ceramic slip; the improvement which comprises using as a binder a composition which comprises 40–90% by weight of an acidic, stable, salt-free silica sol, comprising an aqueous liquid having colloidally dispersed therein 25–50% by weight of substantially discrete, dense, non-agglomerated particles of silica having an average particle diameter of 5–150 mu, said silica sol having a pH range of from 2.6 to 3.8 and a specific conductivity not greater than 1000 micromhos/cm., at 77° F., and 10–60% by weight of a lower alkyl polar organic alcohol, having a carbon atom content no greater than 4, said alcohol being compatible with said silica sol.

(References on following page)

References Cited by the Examiner

UNITED STATES PATENTS

| | | | |
|---|---|---|---|
| 2,741,600 | 4/1956 | Allen | 252—317 XR |
| 2,818,619 | 1/1958 | Bradley et al. | 22—193 |
| 2,842,445 | 7/1958 | Emblem | 106—38.35 |
| 2,912,729 | 11/1959 | Webb | 22—193 |
| 2,926,098 | 2/1960 | Ilenda et al. | 106—38.35 |
| 2,948,032 | 8/1960 | Reuter | 22—193 |
| 2,949,375 | 8/1960 | Reuter | 22—196 |
| 3,051,657 | 8/1962 | Power | 252—313 |
| 3,051,658 | 8/1962 | Power | 252—313 |

FOREIGN PATENTS 1,105,114  4/1961  Germany.

MARCUS U. LYONS, *Primary Examiner.*

MORRIS LIEBMAN, MICHAEL V. BRINDISI,
*Examiners.*